Sept. 16, 1952 D. B. TALIAFERRO ET AL 2,610,506
INSTRUMENT FOR LOCATING THE LIQUID LEVEL IN WELLS
Filed Jan. 7, 1949
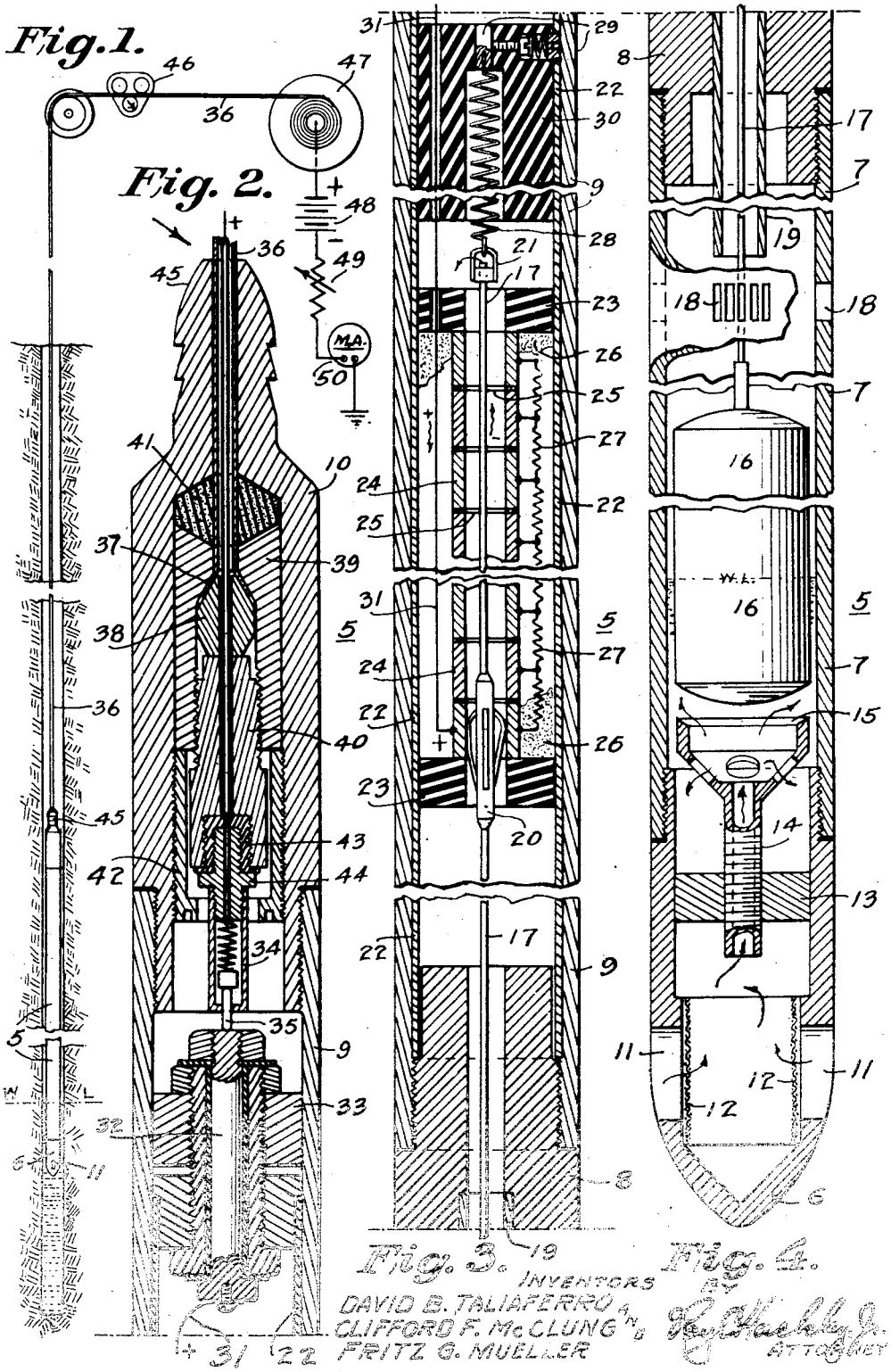
INVENTORS
DAVID B. TALIAFERRO
CLIFFORD F. McCLUNG
FRITZ G. MUELLER
ATTORNEY

UNITED STATES PATENT OFFICE 2,610,506

INSTRUMENT FOR LOCATING THE LIQUID LEVEL IN WELLS

David B. Taliaferro, Bartlesville, Clifford F. McClung, Tulsa, and Fritz G. Mueller, Bartlesville, Okla., assignors to the United States of America as represented by the Secretary of the Interior Application January 7, 1949, Serial No. 69,762

3 Claims. (Cl. 73—151)

(Granted under the act of March 3, 1883, as amended April 30, 1928; 370 O. G. 757)

The invention described herein may be manufactured and used by or for the Government of the United States for governmental purposes without the payment to us of any royalty thereon in accordance with the provisions of the act of April 30, 1928 (ch. 460, 45 Stat. L. 467).

Our device relates to an apparatus for locating the liquid levels in wells and particularly for following liquid levels in wells of any depth and under any pressure conditions.

Figure 1 is a diagram showing our device within an unlined well.

Figure 2 is an elevation, partly in section of the upper portion of our device.

Figure 3 is an elevation, partly in section, of an intermediate portion of our device.

Figure 4 is an elevation, partly in section, of a lower portion of our device.

Referring to these drawings, our liquid level gage 5 is provided with an outer shell formed in sections which are united by screw-threaded telescoping couplings. This shell comprises a bottom nose 6, a lower outer shell 7, a chamber forming connecting sleeve 8, an upper outer shell 9, and an instrument head 10. The bottom nose 6 is provided with one or more transverse apertures 11, an internal screen 12 for the apertures 11, and a transverse bottom stop support 13 having an internally threaded central aperture for a hollow externally threaded stem 14 of an annular stop 15. Within the lower outer shell 7 there is an elongated hollow metal float 16 provided with a pressure qualizing upwardly extending tubular float arm 17.

The shell 7 is provided with a plurality of pressure relief slots 18 above the lowest position of the float 16 leaving a gas confining chamber within said shell 7 and within an upper tubular float stop 19 said stop being frictionally held within the connecting sleeve 8. The float arm 17 extends upwardly through the float stop 19, carries an electrical sliding contact 20 and is terminally open within an external bail 21.

The upper outer shell 9 encloses an alignment tube 22 which in turn encloses two spaced insulating disks 23 between which are held a plurality of contact sleeves 24 insulated from each other by a plurality of insulating washers 25, and surrounded by suitable insulating packing 26 of asbestos or the like which may be compacted and/or cemented while the sleeves 23 contact sleeves 24 and washers 25 are held in alignment. Each contact sleeve 24 is electrically connected in series with a plurality of contact resistors 27.

The bail 21 is electrically connected with a coiled ground wire 28 to a ground wire assembly 29 mounted in a group contact support 30 which fits within the alignment tube 22. A positive wire 31 is electrically connected to the lowermost of the contact sleeves 24 and extends upwardly through the upper disk 23 and the ground contact support 30 to a positive contact bolt 32 mounted in a support 33 in the upper shell 9 and is suitably insulated therefrom. The instrument head 10 when coupled with the upper outer shell 9 supports a positive contact assembly 34 which resiliently presses a contact 35 against the upper end of the positive contact bolt 32 thereby closing a circuit from an armored cable 36.

A gas confining chamber is provided in the instrument between the upper edges of the pressure relief slots 18 and the ground contact support 30 which closes the chamber formed by a succession of connected tubular chambers, comprising those in the portion of the outer shell 7 above the slots 18, the upwardly extending chamber in the tubular float stop 19, the connecting chamber in the alignment tube 22, the chamber formed by two hollow insulating disks 23, the contact sleeves 24 and washers 25, a chamber formed above the upper disk 23 and the chamber for the coiled ground wire 28. As actually built, there would be no chambers surrounding the positive wire 31 in either the disk 23 or the ground contact support 30, that space having been left on the drawings for clearly illustrating the contact wire 31.

From the foregoing recital, it is obvious that this instrument is provided with an elongated chamber with no fluid opening above the slots 18. This chamber initially contains only air or gas and is so proportioned that even under the greatest pressures to which the instrument may be subjected the compressed confined gas will exclude all liquid from entering the chamber within the current conducting contact sleeves 24.

Our instrument is securely fastened to the cable armor 37 by a conical cable armor clamp 38 within a compression sleeve 39, the latter being internally threaded below the clamp 38 to receive a threaded clamp nipple 40. A rubber sealing washer 41 surrounds our cable 36 within our instrument head 10 and is compressed by means of a compression screw 42 bearing against our compression sleeve 39 thereby compressing the washer 41 to form a liquid tight seal as well as providing an additional clamping means between our gauge and cable 36.

The insulation on the current-supplying wire of our cable 36 ends at a centrally apertured externally threaded cable insulator 43. The current-applying wire is threaded through the insulator 43 into an externally threaded metal nipple 44 with which it makes electrical contact. The nipple 44 is supported by external threads in the insulator 43 and in turn supports the positive contact assembly 34.

The upper end of our instrument head is reduced to form a fishing nose 45 having a plurality of serrations to facilitate recovery with a spring socket type of "fishing tool," for use in case of cable breakage within or close to the head, while other types of fishing tools may be used for gripping a broken cable.

The cable 36 is passed through a line measuring meter 46 for indicating the depth to which our instrument is lowered, and then passes to a storage reel 47 which electrically connects the conducting wire of the cable 36 to a suitable battery 48, or other source of current. The battery 48 is connected through a variable resistance 49 to a milliammeter 50, then to a ground which may include the cable armor and a non-insulated cable support or the external shell of our gauge 5 and instrument enveloping fluid. When testing a well under gas pressure which necessitates closing the mouth of the well with packing through which the cable 36 will be passed, the weight of our instrument with the suspending cable may be insufficient to lower the instrument in which case weights may be attached around the cable above our instrument to supply additional force.

The diagram shown in Figure 1 indicates a preferred manner of use of our instrument, omitting for the sake of clearness such well known equipment as a cable supporting framework. Our liquid level gauge 5 after being tested and calibrated is lowered into a well to be tested after first reading the depth indicator 46 or setting it at zero and checking the setting of the variable resistance 49 and the reading of the milliammeter 50, the circuit being open because the float 16 will be at rest on the annular stop 15 with the vent opening of the float arm 17 within the gas confining chamber and the sliding contact 20 will not be in electrical contact with any contact sleeve 24. As the lowering of our instrument continues, contact will be made with liquid standing in the well, and as lowering proceeds the liquid will flow through the screened apertures 11 and the stem 14 and lift our float 16 off its seat and raise the attached float arm 17 and sliding contact 20. When the contact 20 reaches the lowermost contact sleeve 24 (see Figure 3) the electrical circuit will be closed and this will be registered on the milliammeter 50 which may then be adjusted by means of the variable resistance to a desired reading. In this position current will flow from the battery 48 to the axle of the storage reel 47, which is electrically connected with the insulated wire in the armored cable 36, thence to the nipple 44, the contact 35, positive contact bolt 32, positive wire 31, to the lowermost contact sleeve 24, then return through a grounded circuit comprising the sliding contact 20, tubular float arm 17, bail 21, ground wire assembly 29, upper outer shell 9, instrument head 10, the cable armor 37, and the earth, to the milliammeter 50, variable resistance 49, and back to the battery 48, the place from which the tracing of the circuit started. This circuit will usually include between the lowermost contact sleeve 24 and the sliding contact 20 one or more sections of the contact resistor 27 and one or more contact sleeves 24 above the lowest sleeves, the number depending upon the level of the float 16. The deflection of the milliammeter will depend upon the length of the contact resistor in the circuit, and by means of the previous calibration these readings may be converted into linear equivalents of the fluctuations in level of the liquid surrounding our instrument.

A novel feature of the applicants' instrument is the combination of a hollow metal float provided with an upwardly extending pressure equalizing tube 17, which opens into a downwardly open gas confining chamber and a provision of the lower annular float stop 15 and the upper annular float stop 19 which stops restrict the travel of the opening of the equalizing tube 17 within the gas confining chamber. This combination protects the hollow metal float 20 from crushing by excessive external fluid pressure and also provides means for excluding liquid from entering the float through the venting tube 17 or short circuiting the contact sleeves 24 within the maximum fluid pressures for which the instrument may be designed.

It should be understood that the present disclosure is for the purpose of illustration only and that the invention includes all modifications and equivalents which fall within the spirit and scope of the appended claims in which it is our intention to claim all novelty inherent in our invention as broadly as possible in view of the prior art.

What we claim is:

1. An instrument for indicating fluctuations in the liquid level in wells by the closing of an electric circuit which comprises a protective shell provided with lower screened apertures for the admission of liquid and an upper plurality of pressure equalizing apertures spaced from the upper end of said shell to define a gas confining chamber, a hollow float provided with an upwardly extending pressure equalizing tube which tube opens into said chamber above said apertures, a circuit closing sliding electrical contact mounted on said tube with which said sliding contact closes a plurality of circuits in succession, a plurality of electrical contact sleeves, a resistance joining each sleeve to all of the other sleeves in series, and a plurality of sleeve insulating washers separating each sleeve from adjacent sleeves, said sliding contact being reciprocated by said float in response to fluctuations in the level of liquid in which the instrument is suspended.

2. An instrument for indicating the fluctuations of the levels of liquid within wells subjected to a fluctuating gaseous pressure, by the progressive closing of a plurality of electric circuits, which comprises a protective shell provided with a lower plurality of screened apertures and beneath an upper gas confining chamber an upper plurality of pressure equalizing apertures the upper limit of which define said gas confining chamber, a hollow metal float within said shell provided with an upwardly extending pressure equalizing tube, a plurality of circuit closing sliding electrical contacts mounted on said tube, a plurality of electrical contact sleeves with which said sliding contacts close circuits in succession, a plurality of insulating washers insulating each sleeve from adjacent sleeves, a resistance adjacent to said plurality of sleeves and washers, an electrical connection from each of said contact sleeves to corresponding portions of said electrical resistance, a lower float stop, a tubular upper float stop said hollow float with said sliding contacts being reciprocated between said stop by fluctuations in the level of liquid entering said shell from a well in which the said instrument is suspended, a source of electric current, a circuit completing insulated conductor from one of said contact sleeves to suitable indicating apparatus on the surface of the earth, said protective shell serving as a ground return for completing the electric circuit.

3. An instrument for indicating the fluctuations of liquid levels within wells subjected to a fluctuating pressure which comprises a protective shell provided with an upper gas confining chamber, an upper plurality of pressure equalizing apertures which define the lower limit of said chamber, a lower plurality of apertures, a hollow float within said shell between said upper and lower apertures provided with a pressure equalizing venting tube in free communication with said chamber, a circuit closing sliding electrical contact mounted on and reciprocated by fluctuations of the level of said hollow float, a plurality of electrical contact sleeves surrounding said float tube and enclosing an upper portion of said chamber, a plurality of washers which insulate each sleeve from adjacent sleeves, an electric circuit which includes an electrical resistance, an electrical connection from each contact sleeve to a corresponding portion of said resistance, a lower float stop, and an upper tubular float stop which stops define the limits of travel of said venting tube within said upper gas confining chamber as well as the limits of travel of said float, a suitable current fluctuation indicating apparatus connected in said circuit and a source of electric current for said circuit.

DAVID B. TALIAFERRO.
CLIFFORD F. McCLUNG.
FRITZ G. MUELLER.

REFERENCES CITED

The following references are of record in the file of this patent:

UNITED STATES PATENTS

| Number | Name | Date |
| --- | --- | --- |
| 576,208 | Lozier | Feb. 2, 1897 |
| 1,227,286 | Maher | May 22, 1917 |
| 1,695,701 | Steiner et al. | Dec. 18, 1928 |
| 2,134,428 | Scherbatskoy et al. | Oct. 25, 1938 |
| 2,139,810 | Duncan | Dec. 13, 1938 |
| 2,147,500 | Rothenberger et al. | Feb. 14, 1939 |
| 2,275,474 | Scaramucci | Mar. 10, 1942 |
| 2,394,437 | Freeman | Feb. 5, 1946 |

FOREIGN PATENTS

| Number | Country | Date |
| --- | --- | --- |
| 73,661 | Germany | Mar. 1, 1894 |
| 409,102 | Great Britain | Apr. 26, 1934 |